March 29, 1960

J. W. HUDSON 2,930,504

ELECTRICAL JUNCTION BOX

Filed July 22, 1957

INVENTOR.
James W. Hudson
BY
Cromwell, Greist & Warden
Attys.

March 29, 1960

J. W. HUDSON

2,930,504

ELECTRICAL JUNCTION BOX

Filed July 22, 1957

INVENTOR.
James W. Hudson
BY
Cromwell, Greist & Warden
Attys.

March 29, 1960 — J. W. HUDSON — 2,930,504
ELECTRICAL JUNCTION BOX
Filed July 22, 1957 — 5 Sheets-Sheet 5

INVENTOR.
James W. Hudson

United States Patent Office 2,930,504
Patented Mar. 29, 1960

2,930,504

ELECTRICAL JUNCTION BOX

James W. Hudson, Elmhurst, Ill., assignor, by mesne assignments, to The National Supply Company, Pittsburgh, Pa., a corporation of Ohio Application July 22, 1957, Serial No. 673,396

11 Claims. (Cl. 220—3.4)

The present invention is directed to a new and improved junction box for use in underfloor electrical distribution systems which carry the wiring of separate electrical systems such as power lines, telephone cables, interoffice communications, watchman check-out systems, time box systems, closed circuit television hookups, etc.

Underfloor wire distribution systems are heavily relied upon as nerve centers for office buildings, super markets, schools, hospitals, factories, and virtually any other commercial, industrial or institutional building. Such systems have been in use for a number of years; however, existing systems have been found to be either too costly or too complex to be practical for any but the biggest building projects. The largest single difficulty residing in the installation and use of existing systems can be traced to the type of junction boxes in use. Due to the complexity of design and manufacture of existing junction boxes it has generally been considered impossible to produce standardized junction boxes which are adapted to meet the widely varying requirements in underfloor wire distribution systems.

It is an object of the present invention to provide a junction box of improved design which is adapted for standardization in the manufacture thereof, which is of relatively simple construction and readily installed and maintained, which is highly adaptable to varying requirements in floor construction and wiring system changes, and which provides increased internal wire distribution area to allow more efficient wiring system installation and maintenance.

Another object is to provide a junction box of improved design which, following installation in concrete floors or the like, allows full access to the interior thereof for maintenance purposes and which further is so designed as to allow interior rearrangement of its wiring system receiving passageways following the installation of the box in concrete flooring or the like and without the necessity of completely removing the box from the flooring in the event that the box is originally incorrectly installed.

Still another object is to provide a junction box readily adjustable with respect to its height before or following the installation thereof and without the necessity of gaining access into the interior thereof, the box being further capable of transmitting all loads directly to the subflooring thereby forestalling undesirable buckling action of the top plate thereof.

An additional object is to provide a junction box of increased internal capacity while maintaining the depth thereof at a minimum and which is further corrosion-free.

Other objects not specifically set forth will become apparent from the following detailed description made in connection with the drawings wherein.

As shown in the drawings, the junction box 10 consists of a base member 11, cover member 12, partition member 13, ring member 14 and top or cover plate 15. The base member 11 is of a square outline and is formed from a solid bottom plate 16 which is provided about the outer periphery thereof with upstanding integral posts 17. Inwardly of the side edges of the bottom plate 16 are integral upstanding ribs 18 which extend along the top surface of the bottom plate in between the posts 17 and upwardly along the side walls of the posts 17. Each of the corners of the bottom plate 16 is truncated or flattened as shown at 19 to form an angularly arranged opening 20 of semi-circular shape intermediate adjacent posts 17. U-shaped ribs 21 of semi-circular shape are positioned inwardly of the outer edge of the bottom plate 16 defining the openings 20 in a manner similarly as described in connection with the ribs 18. The base member 11 is provided with tapped holes 22 extending through the bottom plate 16 which receive leveling screws 23. The bottom plate 16 is further provided with integral flanges 24 which are in turn provided with tapped holes 25 for a purpose to be described.

Figure 1:
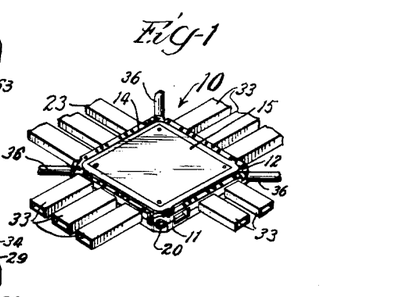
Fig. 1 is a fragmentary perspective view of the junction box of the present invention illustrating its attachment with wiring system ducts and conduits.
Figure 2:
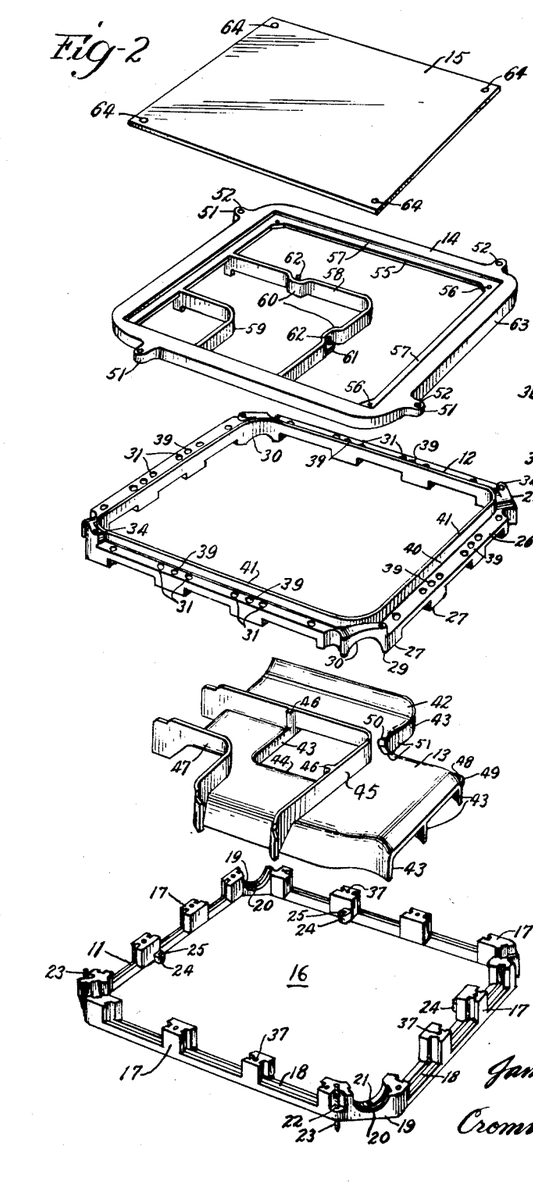
Fig. 2 is a series of perspective views in exploded form of the elements of the junction box.

The cover member 12 is a ring-like member of square outline which is formed with a radially extending flange 26 having downwardly projecting posts 27 integral therewith which are so spaced as to cooperate with the posts 17 of the base member 11 to define therebetween duct receiving apertures. The bottom surface of the cover member 12 is provided with spaced, downwardly directed ribs 28 (see Figs. 5 and 6) which correspond to the ribs 18 and which further cooperate with the ribs 18 to restrict the dimensions of the side duct receiving apertures inwardly of the outer edges of the base member 11 and cover member 12. Each of the corners of the cover member 12 is truncated or flattened as indicated by the numeral 29 to conform with the corners 19 of the base member 11. These corners are cast to form semi-circular openings 30 which when combined with the semi-circular openings 20 of the base member 11 define therebetween a conduit receiving opening. Along the radial flange 26 are a series of laterally spaced tapped holes 31 which receive screws 32 therethrough. The screws 32 are of sufficient length to extend outwardly into the rectangular duct openings to be forced against the outer surface of the ducts to thereby retain the same within the openings upon the assembly of the junction box 10 with ducts 33 as shown in Fig. 1. The cover member 12 is also provided with tapped holes 34 which receive screws 35 therethrough which in turn clamp a wire conduit such as 36 shown in Fig. 1 within the circular openings defined by the corners 19 and 29. To assemble the cover member 12 and the base member 11, tapped holes 37 are provided in the posts 17 to receive screws 38 carried by the flange 26 of the cover member 12 in drilled holes 39. The cover member 12 is further provided with an inwardly recessed groove 40 which defines the inward end of the flange 26. The member 12 is further provided with a vertically extending flange 41 about the internal periphery thereof. The groove 40 and vertical flange 41 are provided for a purpose to be subsequently described.

The partition member 13 is formed generally into a raised flat surface 42 which is supported by a plurality of substantially vertically depending walls 43. A central opening 44 is defined by an upstanding wall 45 which is provided with radially projecting ribs 46. One corner of the partition member 13 is cut away and defined by an upstanding wall 47 which runs substantially parallel to the wall 45. The walls 43, 45 and 47 cooperate to define therebetween a series of wiring passageways which are designed to become aligned with the duct openings defined by the base member 11 and cover member 12. When the partition member 13 is inserted within the body portion of the junction box 10 defined by the base member 11 and cover member 12 it is held against the bottom plate 16 by screws 47 which extend through drilled holes 48 in flanges 49 which are integral with the flat surface 42 of the partition member 13. The flanges 49 are arranged so as to abut the flanges 24 of the base member 11 upon the insertion of the partition member 13 thereinto. The screws 47 are then advanced into the tapped holes 25 and the partition member 13 is securely held within the body portion of the junction box 10. In addition to the above described structure the partition member 13 may be provided with a knockout portion 50 which is defined by a series of grooves 51 in the flat surface 42 thereof. The function of the knockout portion 50 will be subsequently described.

The ring member 14 incorporates many important features of design which will now be described. This member is provided with radially projecting flanges 51 which are supplied with drilled holes 52 to receive leveling screws 53 therethrough. The cover member 12 is provided with tapped holes 54 which receive the screws 53 and supply means for attaching the ring member 14 to the body portion of the junction box 10. The ring 14 is further provided with an inwardly directed flange 55 which extends continuously about the inner periphery thereof and which presents an upwardly directed flat surface. The corners of the flange 55 are provided with tapped holes 56 for a purpose to be described. The flange 55 is further provided with a flat gasket 57 which is cemented thereto along the top surface thereof. It has been found preferable to make use of "Neoprene" gasketing material which is 2-chlorobutadiene-1,3 manufactured by E. I. du Pont de Nemours of Wilmington, Delaware. The ring member 14 is further provided with web-like members 58 and 59, the web 58 including semi-circular portions 60 which partially surround flanges 61 which, in turn, threadedly receive supporting screws 62 therethrough.

Upon the assembly of the ring member 14 to the top surface of the cover member 12, which in turn has been assembled with the base member 11 and partition member 13 as previously described, a downwardly projecting flange 63 which defines the outer side wall of the ring member 14 is received outwardly of the vertical flange 41 of the cover member 12 thereby being introduced into the groove 40 to in effect telescopically receive the flange 41 within the ring member 14. This arrangement provides close fitting surfaces which protect the interior of the junction box from the entry of unhardened concrete or other sub-flooring material. The web members 58 and 59 are so designed as to be aligned in close proximity to the upstanding walls 45 and 47 respectively, of the partition member 13 to provide vertical extensions for the walls 45 and 47 upon increasing the height of the junction box by adjustable retraction of the screws 53. This arrangement further allows the ring member 14 to be strengthened by the presence of the webs 58 and 59 without the latter interfering with the wiring space provided by the partition member 13. The semi-circular portion 60 receives the ribs 46 thereinto thereby aiding in aligning the ring member 14 with the cover member 12. The screws 53 are then advanced into the tapped holes 54 of the cover member 12 to an extent that the ring member 14 is securely attached thereto.

Following this operation the supporting screws 62 are advanced downwardly into contact with the top surface 42 of the partition member 13 to provide to the web member 58 supporting contact with the other elements of the junction box 10. The cover plate 15 is then inserted upon the flange 55 in sealing engagement with the gasket 57. The top plate 15 is provided with tapped holes 64 which receive screws 65 therethrough which in turn are advanced into the tapped holes 56 of the flange 55. By this arrangement the top plate 15 may be securely attached to the ring member 14.

Figure 7:
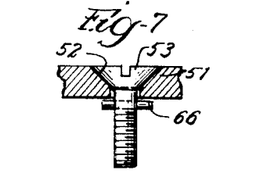
Fig. 7 is an enlarged fragmentary section of one of the clamping flanges of the ring member illustrating the type of clamping means utilized.

In the installation of the junction box above described it is often found desirable to adjust the height of the box or level the top surface thereof following the pouring of the concrete sub-flooring. Under these conditions the box is completely surrounded by hardened concrete and the top surface thereof is the only portion which is exposed for adjustment purposes. It is necessary merely to retract the screws 53 to raise the ring member 14 upwardly with respect to the cover member 12. To bring this about the screws 53, as shown in Fig. 7, are provided with pins 66 which extend through drilled holes in the screw spaced at a distance remote from the head of the screw sufficiently to clear the thickness of the fingers 51. With this arrangement the screws 53 may be rotated within the drilled holes 52 of the flanges 51 while at the same time the ring member 14 is supported by the pins 66 against downward movement into full contact with the cover member 12. In other words, the retracting of the screws 53 under the conditions previously described will, by the action of the pin 66, act to raise the ring member 14 upwardly from the top surface of the cover member 12. Sealing contact is retained between the ring member 14 and the cover member 12 by reason of the cooperation between the flanges 63 and 41. The pins 66 are of sufficient strength to be capable of sustaining any normal loads which may be subjected to the junction box following its complete burial and occupation and use of the building.

As previously stated, if the concrete sub-flooring should be hardened about the box 10 to an extent that access is not available to the leveling screws 23, the screws 53 may be retracted so as to raise the ring member 14 and its associated cover plate 15 to a height which is level with the top surface of the sub-flooring. It is unnecessary to gain access to the interior of the junction box 10 to bring this about. The top plate 15 being of substantially the same dimensions as the over-all dimensions of the junction box 10 upon removal provides full access to all portions of the interior of the junction box 10 and as a result, the electrician may carry out his work with the least possible interference. Due to the rather large dimensions of the top plate 15 the web 58 is placed into load bearing support by use of the screws 62 as previously described. As the web 58 is thereby strongly supported the top plate 15 is incapable of buckling to an extent that the floor covering is harmed. Any loads received by the top plate 15 are transmitted for supporting purposes to all of the elements of the junction box 10 and ultimately to the structural base on which the box is installed.

The base member 11, cover member 12, partition member 13 and ring member 14 above described are especially designed to be readily adapted for manufacture by casting operations. It has been found that the structure of these members allows the castings thereof to be made from lightweight aluminum alloy thereby allowing the members to be cast in thinner, more complex shapes while holding their weight to a minimum, reducing the number of parts required, and eliminating many costly machining and finishing operations. The base member 11 being provided with a flat bottom surface 16 allows quick and efficient leveling of the device by use of the leveling screws 23. Furthermore the flat base combined with the square shape of the junction box results in the provision of a larger interior within which the electrician may more easily string the wires of the various systems. The partition member 13 provides more than 100% of the cross sectional duct area as compared with approximately 80% provided by other systems. Due to the particular shape of the elements described the wires are "fished" through the system more smoothly and more space is available to allow efficient splicing and taping to take place. The partition member 13 rests perfectly on the flat surface 16 of the base member 11 providing maximum duct capacity at a minimum depth.

Figure 8:
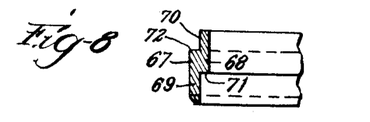
Fig. 8 is a fragmentary section of the extension ring of Figs. 4 and 5.

The ring member 14 and cover member 12 are of a design allowing complete standardization of the junction box 10. With widespread use of the box 10 in floor structures of varying thickness of design, it may be necessary to increase the effective height or vertical thickness of the junction box 10 in order to position the ring member 14 and the cover plate 15 carried thereby in flush relation with the top surface of the sub-flooring. Figs. 4, 5, 8 and 9 illustrate the use of an adaptor or extension ring 67 in the junction box 10 intermediate the cover member 12 and the ring member 14. Referring particularly to Fig. 8, the ring 67 in vertical cross section includes a block-like body portion 68 having depending therefrom a sealing rim or rib 69 and having projecting upwardly therefrom a flange or rim 70. The rims 69 and 70 are offset from one another in a vertical direction to define a bottom inner shoulder 71 and a top outer shoulder 72. As particularly shown in Fig. 9, the extension ring 67 is of rectangular shape and in referring to Fig. 5 it will be noted that the bottom rim 69 is received in the sealing groove 40 of the cover member 12 with the inner shoulder 71 in resting engagement on top outer surface of the inner rib 41. The depending rim 63 of the ring member 14 is received about the upwardly directed rim 70 of the extension ring 67 with the bottom edge thereof in engagement with the top outermost shoulder 72 when the ring member 14 is in the vertically retracted position shown in Fig. 5.

Figure 9:
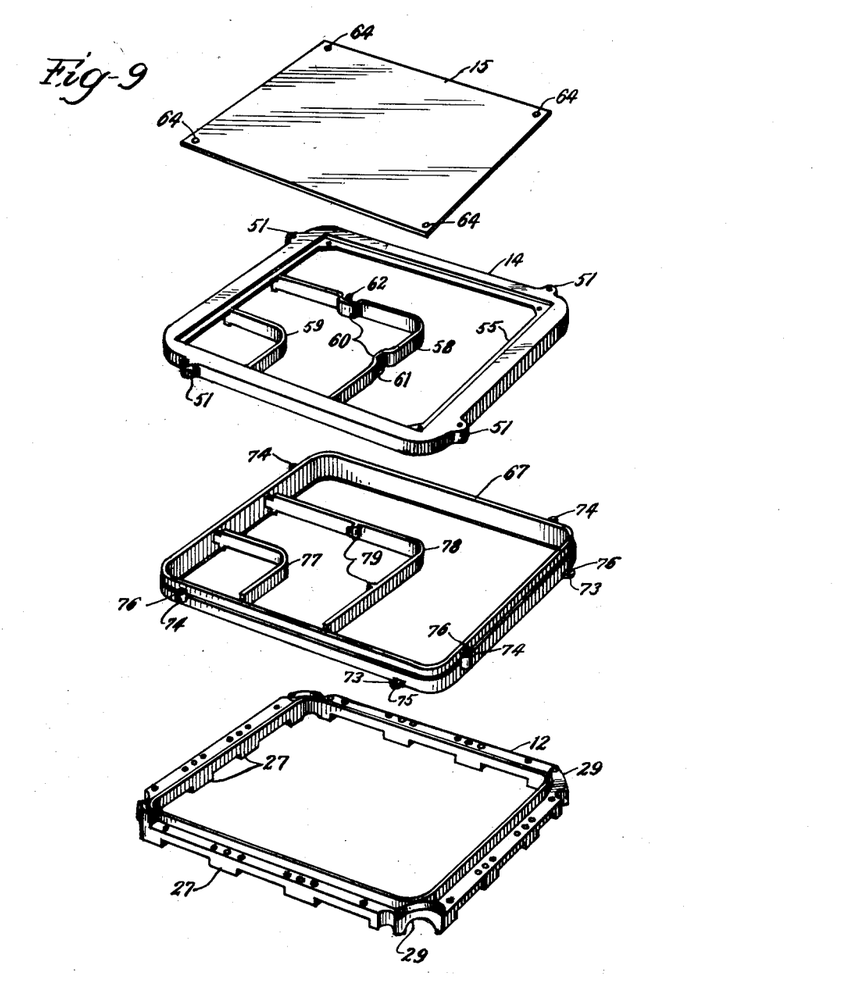
Fig. 9 is an exploded perspective of certain elements of the box of Fig. 4.

Referring to Fig. 9, the outer periphery of the extension ring 67 is provided with a plurality of peripherally spaced short flanges 73 and a plurality of peripherally spaced long flanges 74. The short flanges 73 are provided with drilled openings 75 therethrough and the long flanges 74 are provided with tapped openings 76 extending therethrough. The flanges 73 and 74 are alternately spaced and upon assembly of the ring 67 with the cover member 12, the flanges 73 become aligned with tapped openings in the shoulder portion 26 of the cover member 12 to receive fastening elements therethrough which attach the extension ring 67 to the body portion of the junction box 10. The long flanges 74 are aligned with the attaching flanges 51 of the ring member 14 and the load bearing screws 53 are threadedly received in the openings 76 therein.

As particularly shown in Fig. 9, the extension ring 67 includes a pair of inwardly directed web-like members 77 and 78 which correspond with the webs 58 and 59 of the ring member 14. Upon positioning of the ring 67 on the cover member 12, the webs 77 and 78 become vertically aligned with the upstanding wall portions 47 and 45, respectively, of the partition member 13. In this manner the wall portions 45 and 47 are extended vertically upwardly to maintain separation between the wire feeding passageways defined by the upper portion of the partition member 13. The webs 58 and 59 of the ring member 14 are, of course, offset from the webs 77 and 78 and are received in overlapping relation relative thereto upon the mounting of the ring member 14 in its operative position. The load bearing screws 53 may be advanced or retracted within the tapped openings 76 of the long flanges 74 of the extension ring 67 to raise or lower the ring member 14 relative thereto for height adjustment purposes, and in doing so, the webs 58 and 59 move relative to the webs 78 and 77, respectively, in a telescopic manner. As particularly shown in Fig. 9, the web 78 of the extension ring 67 is provided with radially projecting rib-like members 79 which function in the same manner as the ribs 46 previously described.

Figure 5:
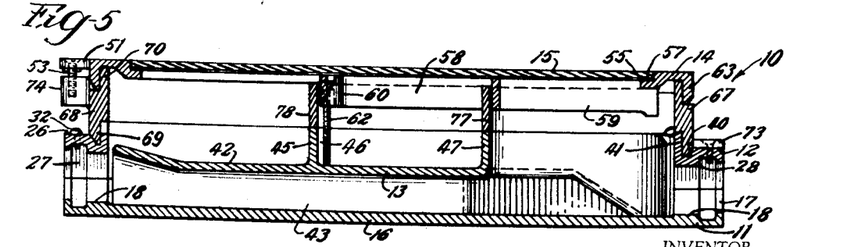
Fig. 5 is a sectional view of the box of Fig. 4 being taken generally along line 5—5 in Fig. 4.
Figure 6:
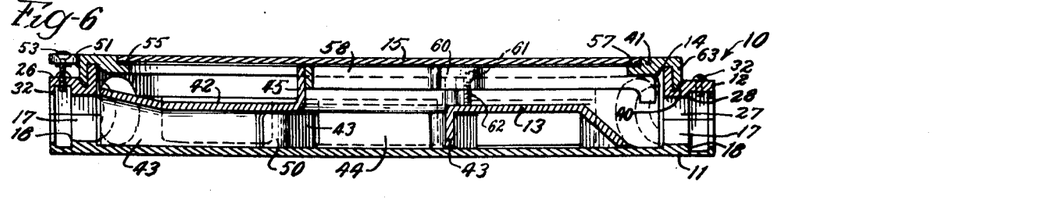
Fig. 6 is a sectional view taken generally along line 6—6 in Fig. 3.

The body portion 68 of the ring extension 67 may be of any desired vertical thickness in order to provide the requisite height adjustment to the junction box 10. A number of rings 67 of varying height may be provided to meet the different requirements during installation of the junction box and by provision of the rims 69 and 70, complete efficient sealing action is maintained between the cover member 12 and the ring member 14. As shown in Fig. 5 the supporting screws 62 are of increased length when the ring extension 67 is applied to the box 10, the purpose of the screws 62 being to bottom the web 58 of the ring member 14 against the top surface of the partition member 13 to provide the central portion of the cover plate 15 with support against buckling.

Figure 10:
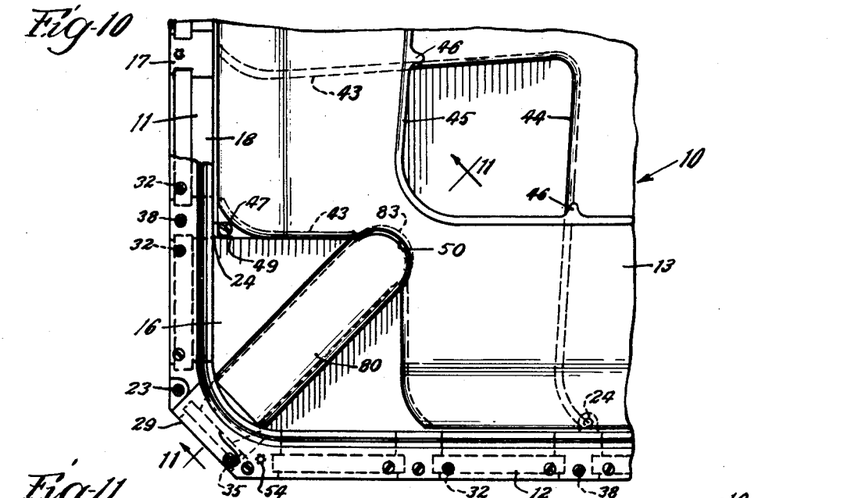
Fig. 10 is a fragmentary plan view of a corner of the body portion of a box with the interior being rearranged by use of a tunnel insert forming a part of the present invention.
Figure 11:
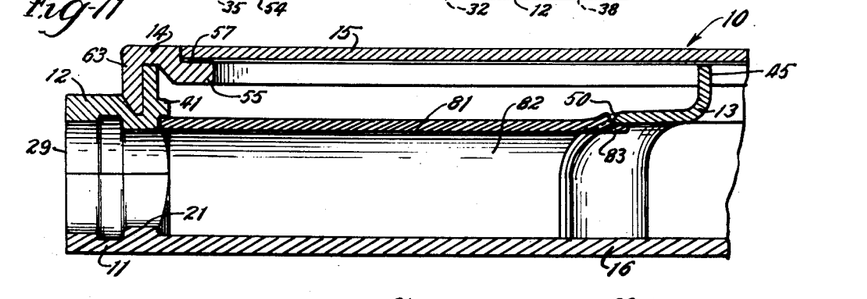
Fig. 11 is an enlarged sectional view taken generally along line 11—11 of Fig. 10.
Figure 12:
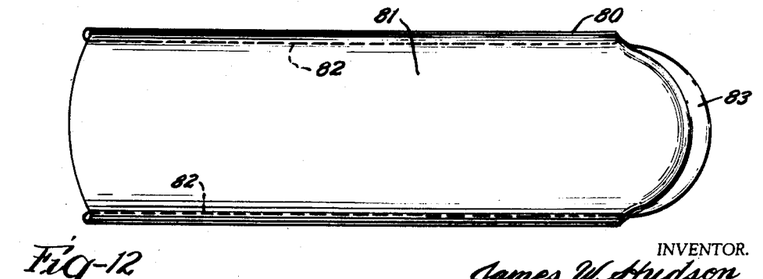
Fig. 12 is an enlarged plan view of the tunnel insert.

Still another important feature of the junction box 10 resides in the use of the knockout portion 50 of the partition member 13. This knockout portion may be used in the event that it is desired to bring a wiring system into or out of the centrally located passageway defined by the partition member 13 while making use of one of the conduit receiving openings. Suitable protective means may be used to maintain wire separation upon use of the knockout portion 50 as shown in Figs. 10–12.

An insert tunnel 80 is used to extend between the opening in the partition member 13 defined by the knockout portion 50 and the adjacent conduit opening 29 in the junction box 10 to communicate the conduit opening 29 with the central opening 44 of the partition member 13. The tunnel 80 is of inverted U-shape in cross section being provided with a horizontally directed top wall 81 and transversely spaced, vertically depending side walls 82. The forward or innermost edge of the top wall 81 is provided with a beveled lip 83 of arcuate shape which is telescopically received within the knockout opening of the partition member 13 as particularly shown in Fig. 11. The outermost edge of the top wall 81 is arcuate and the depending side walls 82 project outwardly therefrom for receiving within the adjacent conduit opening 29 of the body portion of the junction box 10. As shown in Fig. 10, the tunnel 80 is diagonally positioned within the box 10 and by use of the same the passageways as defined by the partition member 13 are rearranged to provide for variation in wiring.

Figure 3:
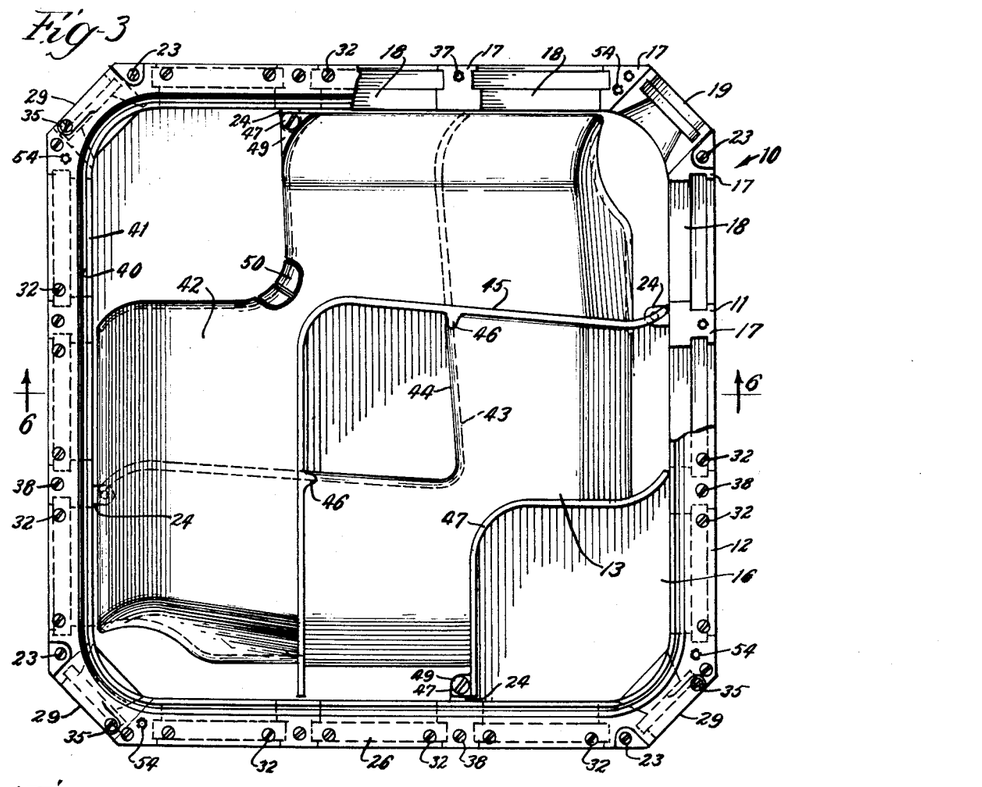
Fig. 3 is a top plan view of the junction box with the top plate and ring member removed and being partially broken away to further illustrate the base member.
Figure 4:
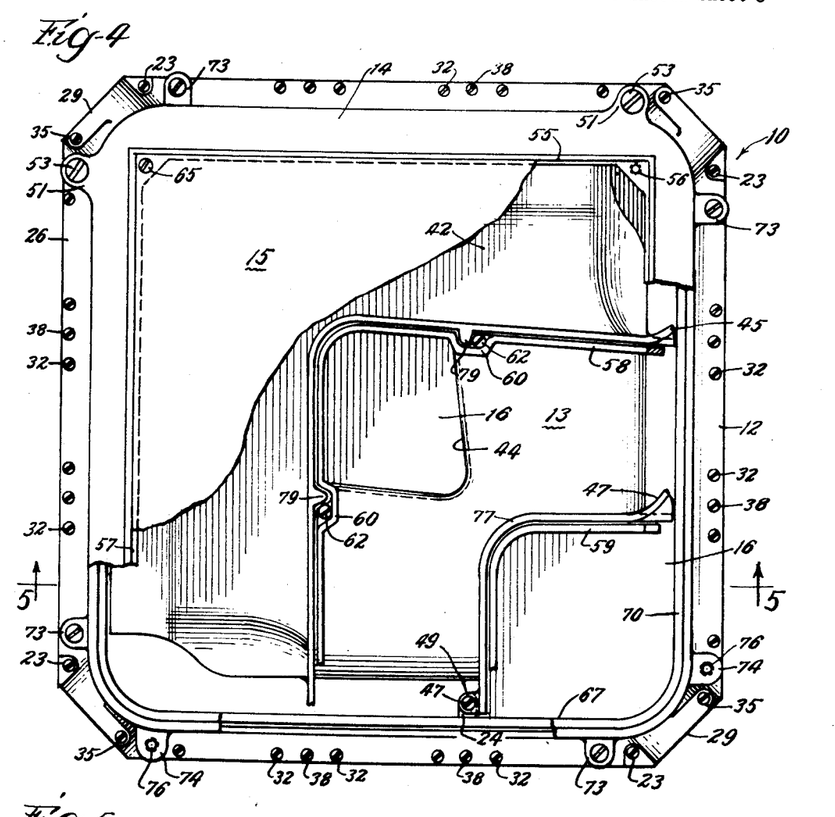
Fig. 4 is a top plan view of a slightly modified and fully assembled junction box including an extension ring and having the top plate and plate-carrying ring member partially broken away.

In the event that the body portion of the junction box is incorrectly installed and the sub-flooring concrete is poured and hardened, it is possible to rearrange the interior of the junction box so as to retain proper separation between the various wiring systems entering and leaving the box. An example of this rearrangement may be illustrated in connection with Fig. 3 where all of the flanges 24 are shown while only two of them are illustrated as being used in retaining the partition member 13 within the body portion of the junction box. The duct system defined by the walls and flat surfaces of the partition member 13 may be rearranged within the box by merely disconnecting the partition member 13 by removing the screws 47 and rotating the partition member 13 in the desired direction, as for example to align the flanges 49 with the second pair of flanges 24. The screws 47 are then used to attach the partition member 13 in its new position and the wiring passageways defined thereby are re-aligned with the duct openings of the body portion. Further rearrangement can also be obtained by use of the tunnel insert 80 and knockout portion 50. As a result it is unnecessary to completely remove the junction box 10 from the sub-flooring which normally entails the breaking of adjacent hardened concrete sections as well as the cutting of the ducts 33 leading into the junction box.

It has been found perferable to provide the various components of the junction box 10 with a baked-on synthetic resin finish thereby allowing the boxes to be stored under moist conditions which normally occur in the vicinity of concrete construction without the insulations becoming rusted or otherwise damaged. The coating may further provide a distinctive color which is capable of contrasting with the color of the other building materials, thereby providing maximum visibility during installation of the system. Additional corrosion safeguards such as the use of cadmium plated screws and galvanizing of all steel duct-work have been found highly desirable. Positive electrical grounding of the entire system is provided through the use of cadmium plated set screws 32 which when tightened against the outer top surface of the ducts 33 positioned within the duct openings bites into the surface of the ducts thereby grounding the entire installation. For structural purposes the top plate 15 is preferably formed from structural steel and electrolytic corrosion occurring between steel and aluminum is eliminated by forming the screws 65 from stainless steel.

The tapped holes 64 of the top plate 55 are preferably designed to receive larger sized screws than the screws 65. By this arrangement the screws 65 will pass loosely through the tapped holes 64 and be threadedly received by the tapped holes 56. In the event that the top plate 15 is to be removed, larger sized screws which are capable of being threadedly received by the tapped holes 64 may be inserted thereinto and used as means to grasp and lift the top plate 15 out of contact with the ring member 14.

Obviously the square outline of the top plate 15 and ring member 14 is adapted to receive a single square of linoleum floor covering or the like directly thereover thereby requiring the removal of only a small section of floor covering to gain full access into the interior of the junction box for rewiring or maintenance purposes. As previously stated, the height adjustment means of the junction box are fully accessible for use without requiring destruction of the surrounding sub-flooring material.

This application is a continuation-in-part of my copending application, Serial No. 537,265, filed September 28, 1955, now abandoned.

Obviously many modifications and variations of the invention as hereinbefore set forth may be made without departing from the spirit and scope thereof, and therefore only such limitations should be imposed as are indicated in the appended claims.

I claim:

1. A junction box for receiving and dispensing a plurality of separate electrical wiring systems, said box including a body portion having a plurality of spaced, radially opening duct and conduit receiving apertures, a partition member internally positioned within said body portion and defining therewithin wiring system receiving passageways in alignment with said duct and conduit receiving apertures, a ring member removably retained by said body portion, said ring member having a top plate receiving flange about the internal periphery thereof and an internally extending supporting web integral therewith, adjustable means carried by said web for abutment with said partition member, and a top plate received interiorly by said ring member, a center portion of said top plate being supported against substantial buckling by said web.

2. A junction box for receiving and dispensing a plurality of separate electrical wiring systems, said box including a body portion open at the top thereof and having a plurality of spaced, radially opening duct and conduit receiving apertures along the sides thereof, a partition member internally positioned within said body portion and defining therewithin wiring system receiving passageways in alignment with said duct and conduit receiving apertures, a ring member removably retained by said body portion, said ring member having a central opening which is substantially equal to the top opening of said body portion, said ring member being further provided with a top plate receiving flange about the internal periphery thereof and an internally extending web-like structure integral therewith, adjustable means carried by said web-like structure for abutment with the top surface of said partition member, and a top plate received interiorly by said ring member on said flange, a center portion of said top plate being supported against substantial inward buckling by said web-like structure and said adjustable means, said partition including wall portions which project upwardly from the top surfaces thereof to partially define some of said passageways, said web-like structure being vertically directed wall segments which are slightly offset relative to said wall portions to move past the same in vertically overlapping relation to extend the same.

3. A junction box for receiving and dispensing a plurality of separate electrical wiring systems, said box including a body portion having a plurality of spaced, radially opening duct and conduit receiving apertures, a partition member internally positioned within said body portion and defining therewithin wiring system receiving passageways in alignment with said duct and conduit receiving apertures, a ring member removably retained by said body portion, said ring member having a top plate receiving flange about the internal periphery thereof and an internally extending supporting web integral therewith, adjustable means carried by said web for abutment with said partition member, and a top plate received interiorly by said ring member, a center portion of said top plate being supported against substantial buckling by said web, said partition member being formed from integrally connected horizontally and vertically directed wall portions defining said separated passageways, a vertically directed wall portion thereof being provided with a peripherally scored knockout portion for removal in rearranging said passageways relative to said apertures while maintaining the original positioning of said partition member within said body portion.

4. A junction box for receiving and dispensing a plurality of separate electrical wiring systems, said box including a body portion having a plurality of spaced, radially opening duct and conduit receiving apertures, a partition member internally positioned within said body portion and defining therewithin wiring system receiving passageways in alignment with said duct and conduit receiving apertures, a ring member removably retained by said body portion, said ring member having a top plate receiving flange about the internal periphery thereof and an internally extending supporting web integral therewith, adjustable means carried by said web for abutment with said partition member, and a top plate received interiorly by said ring member, a center portion of said top plate being supported against substantial buckling by said web, said partition member being formed from integrally connected horizontally and vertically directed wall portions defining said separated passageways, a vertically directed wall portion thereof being provided with an opening therein spaced inwardly from an aperture which is in enclosed communication therewith by a removable tunnel-like element which rearranges said passageways relative to said apertures while maintaining the original positioning of said partition member within said body portion.

5. A junction box for receiving and dispensing a plurality of separate electrical wiring systems, said box including a body portion open at the top thereof and having a plurality of spaced, radially opening duct and conduit receiving apertures along the sides thereof, a partition member internally positioned within said body portion and defining therewithin wiring system receiving passageways in alignment with said duct and conduit receiving apertures, a ring member removably retained by said body portion, said ring member having a central opening which is substantially equal to the top opening of said body portion, said ring member being further provided with a top plate receiving flange about the internal periphery thereof and an internally extending web-like structure integral therewith, adjustable means carried by said web-like structure for abutment with the top surface of said partition member, and a top plate received interiorly by said ring member on said flange, a center portion of said top plate being supported against substantial inward buckling by said web-like structure and said adjustable means, said partition including wall portions which project upwardly from the top surfaces thereof to partially define some of said passageways, said web-like structure being vertically directed wall segments which are slightly offset relative to said wall portions to move past the same in vertically overlapping relation to extend the same, a vertically directed wall portion of said partition member being provided with an opening therein diagonally spaced inwardly from a conduit receiving aperture which is in enclosed communication therewith by a removable tunnel-like element which rearranges said passageways relative to said apertures while maintaining the original position of said partition member within said body portion.

6. A junction box for receiving and dispensing a plurality of separate electrical wiring systems, said box including base and cover members of square outline defining therebetween a plurality of spaced, radially opening duct receiving apertures, electrical conduit receiving apertures defined by said members and opening radially therefrom at the corners thereof, means in said cover member to retain ducts and conduits in said apertures and electrically ground said box, a one-piece partition member internally positioned within said base and cover members and defining therewithin wiring system receiving passageways in alignment with said duct and conduit receiving apertures, said passageways each having an internal area at least equal to that of its associated duct or conduit, a ring member removably retained by said cover member, said ring member having a top plate receiving flange about the internal periphery thereof and an internally extending supporting wed integral therewith, exteriorly accessible supporting means carried by said ring member to adjust the height thereof relative to said base and cover members, adjustable means carried by said web for abutment with said partition member, and a top plate received interiorly by said ring member, a central portion of said plate being supported against substantial buckling by said web.

7. A junction box for receiving and dispensing a plurality of separate electrical wiring systems, said box including a body portion having a plurality of spaced, radially opening duct and conduct receiving apertures, a partition member internally positioned within said body portion and defining therewithin wiring system receiving passageways in alignment with said duct and conduit receiving apertures, a height adaptor of ring-like outline removably retained by said body portion, a cover supporting ring member removably retained by said adaptor, a removable cover plate carried by said ring member, said adaptor and ring member each having integrally formed with the inner periphery thereof an inwardly extending web-like structure with that of said ring member being slightly offset relative to that of said adaptor to move past the latter in vertically overlapping relation to extend the same, said web-like structures being vertically arranged relative to upstanding wall segments of said partition member to maintain separation of the passageways defined by said wall segments within said body portion, and adjustable means carried by the web-like structure of said ring member in abutment with said partition member, a center portion of the cover plate being supported against substantial buckling by the web-like structure of said ring member.

8. A junction box for receiving and dispensing a plurality of separate electrical wiring systems, said box including a body portion having a plurality of spaced, radially opening duct and conduit receiving apertures, a partition member internally positioned within said body portion and defining therewithin wiring system receiving passageways in alignment with said duct and conduit receiving apertures, a height adaptor of ring-like outline removably retained by said body portion, a cover supporting ring member removably retained by said adaptor, a removable cover plate carried by said ring member, said adaptor and ring member each having integrally formed with the inner periphery thereof an inwardly extending web-like structure with that of said ring member being slightly offset relative to that of said adaptor to move past the latter in vertically overlapping relation to extend the same, said web-like structures being vertically arranged relative to upstanding wall segments of said partition member to maintain separation of the passageways defined by said wall segments within said body portion, exteriorly accessible supporting means carried by said adaptor and ring member to adjust the height thereof relative to said body portion, and adjustable means carried by the web-like structure of said ring member in abutment with said partition member, a center portion of the cover plate being supported against substantial buckling by the web-like structure of said ring member.

9. A junction box for receiving and dispensing a plurality of separate electrical wiring systems, said box including a body portion having a plurality of spaced, radially opening duct and conduit receiving apertures, a partition member internally positioned within said body portion and defining therewithin wiring system receiving passageways in alignment with said duct and conduit rereicing apertures, a ring member removably retained by said body portion, said ring member having a top plate receiving flange about the internal periphery thereof and a thin internally extending supporting web integral with said flange and extending at least substantially to the center of said ring member in a horizontal plane and a top plate received interiorly by said ring member on said flange and overlying said web, a center portion of said top plate being supported against substantial inward buckling by said web.

10. A junction box for receiving and dispensing a plurality of separate electrical wiring systems, said box including a body portion open at the top thereof and having a plurality of spaced, radially opening duct and conduit receiving aperatures along the sides thereof, a partition member internally positioned within said body portion and defining therewithin wiring system receiving passageways in alignment with said duct and conduit receiving apertures, a ring member removably retained by said body portion, said ring member being further provided with a top plate receiving flange about the internal periphery thereof and an internally extending web-like structure integral with said flange and extending at least substantially to the center of said ring member in a horizontal plane and a top plate received interiorly by said ring member on said flange and overlying said web-like structure, a center portion of said top plate being supported against substantial inward buckling by said web-like structure, said partition including at least one wall portion projecting upwardly therefrom to partially define some of said passageways, said web-like structure including a vertically directed wall-like segment which is slightly offset relative to said wall portion in vertically overlapping and closely associated relation therewith to cooperatively partially define said passageways therewith.

11. The junction box of claim 10 wherein said web-like structure carries vertically adjustable means for engagement with said partition member to place said partition member in load bearing support of said web-like structure.

References Cited in the file of this patent

UNITED STATES PATENTS

| | | |
|---|---|---|
| 1,626,570 | Walker | Apr. 26, 1927 |
| 1,839,258 | Phillips | Jan. 5, 1932 |
| 1,893,268 | Boucher | Jan. 3, 1933 |
| 2,043,648 | Bissell et al. | June 9, 1936 |
| 2,046,351 | Walker | July 7, 1936 |
| 2,611,500 | Martin | Sept. 23, 1952 |

FOREIGN PATENTS

| | | |
|---|---|---|
| 380,791 | Great Britain | Sept. 20, 1932 |
| 55,377 | Norway | July 1, 1935 |